(12) United States Patent
Norman et al.

(10) Patent No.: US 7,897,285 B2
(45) Date of Patent: Mar. 1, 2011

(54) FUEL CELL SYSTEM INCLUDING GAS RECYCLING AND PRESSURIZING ASSEMBLY

(75) Inventors: Timothy J. Norman, Acton, MA (US); Cecelia C. Cropley, Acton, MA (US); Monjid Hamdan, Worcester, MA (US); Jason M. Willey, Acton, MA (US)

(73) Assignee: Giner Electrochemical Systems, LLC, Newton, MA (US)

( * ) Notice: Subject to any disclaimer, the term of this patent is extended or adjusted under 35 U.S.C. 154(b) by 731 days.

(21) Appl. No.: 11/521,078

(22) Filed: Sep. 13, 2006

(65) Prior Publication Data
US 2011/0020716 A1 Jan. 27, 2011

Related U.S. Application Data

(60) Provisional application No. 60/716,592, filed on Sep. 13, 2005.

(51) Int. Cl.
*H01M 8/00* (2006.01)

(52) U.S. Cl. ............... 429/400; 429/408; 429/414; 429/415; 429/416; 429/417; 429/428; 429/444

(58) Field of Classification Search ............... 429/12, 429/34, 400, 428, 408, 414, 415, 416, 417, 429/444
See application file for complete search history.

(56) References Cited

U.S. PATENT DOCUMENTS

| | | | |
|---|---|---|---|
| 7,416,808 B2 * | 8/2008 | Fujita et al. | 429/38 |
| 2004/0121218 A1 * | 6/2004 | Andrews | 429/38 |
| 2006/0222912 A1 * | 10/2006 | Smith | 429/21 |

* cited by examiner

*Primary Examiner*—Jane Rhee
(74) *Attorney, Agent, or Firm*—Kriegsman & Kriegsman

(57) ABSTRACT

A fuel cell system including a gas recycling and re-pressurizing assembly. In one embodiment, the fuel cell system includes a fuel cell stack, the stack having an oxygen outlet and an oxygen inlet. The fuel cell system additionally includes two gas/water separator tanks, each of the tanks containing a quantity of water and a quantity of oxygen gas. Both tanks are capable of being fluidly connected to either the oxygen inlet or the oxygen outlet of the fuel cell stack. In addition, the two tanks are connected to one another so that water may be transferred back and forth between the two tanks. The system also includes a pump for transferring water back and forth between the tanks.

20 Claims, 7 Drawing Sheets

FUEL CELL SYSTEM INCLUDING GAS RECYCLING AND PRESSURIZING ASSEMBLY

CROSS-REFERENCE TO RELATED APPLICATIONS

The present application claims the benefit under 35 U.S.C. 119(e) of U.S. Provisional Patent Application Ser. No. 60/716,592, filed Sep. 13, 2005, the disclosure of which is incorporated herein by reference.

STATEMENT REGARDING FEDERALLY SPONSORED RESEARCH OR DEVELOPMENT

This invention was made with Government support under HQ0006-04-C-7050 and HQ0006-04-C-7080 awarded by the Missile Defense Agency. Government has certain rights in the invention.

BACKGROUND OF THE INVENTION

The present invention relates generally to fuel cells and relates more particularly to a novel fuel cell system.

Fuel cells are electrochemical devices in which a free energy change resulting from a fuel oxidation reaction is converted into electrical energy. Because of their comparatively high inherent efficiencies and comparatively low emissions, fuel cells are presently receiving considerable attention as a possible alternative to the combustion of nonrenewable fossil fuels in a variety of applications.

A typical fuel cell comprises a fuel electrode (i.e., anode) and an oxidant electrode (i.e., cathode), the two electrodes being separated by an electrolyte that is a good conductor of ions but a poor conductor of electrons. The electrodes are connected electrically to a load, such as an electronic circuit, by an external circuit conductor. Oxidation of the fuel at the anode produces electrons that flow through the external circuit to the cathode producing an electric current. The electrons react with an oxidant at the cathode. In theory, any substance capable of chemical oxidation that can be supplied continuously to the anode can serve as the fuel for the fuel cell, and any material that can be reduced at a sufficient rate at the cathode can serve as the oxidant for the fuel cell.

In one well-known type of fuel cell, sometimes referred to as a hydrogen fuel cell, gaseous hydrogen serves as the fuel, and gaseous oxygen serves as the oxidant. The electrodes in a hydrogen fuel cell are typically porous to permit the gas-electrolyte junction to be as great as possible. At the anode, incoming hydrogen gas ionizes to produce hydrogen ions and electrons. Since the electrolyte is a non-electronic conductor, the electrons flow away from the anode via the external circuit, producing an electric current. At the cathode, oxygen gas reacts with hydrogen ions migrating through the electrolyte and the incoming electrons from the external circuit to produce water as a byproduct. The overall reaction that takes place in the fuel cell is the sum of the anode and cathode reactions, with part of the free energy of reaction being released directly as electrical energy and with another part of the free energy being released as heat at the fuel cell. Although the electrolyte of a fuel cell may be a liquid electrolyte, more commonly the electrolyte of a fuel cell is a solid polymer electrolyte or proton exchange membrane (PEM). One of the more common types of PEMs is a perfluorosulfonic acid (PFSA) polymer, said PFSA polymer being formed by the copolymerization of tetrafluoroethylene and perfluorovinylether sulfonic acid. Often, a number of fuel cells are assembled together in order to meet desired voltage and current requirements. One common type of assembly, often referred to as a bipolar stack, comprises a plurality of stacked fuel cells that are electrically connected in series in a bipolar configuration.

Most fuel cells are run using a finite quantity of fuel, the fuel typically being withdrawn from a storage vessel as needed. For example, in the case of a hydrogen fuel cell, hydrogen gas is typically stored in and withdrawn from a hydrogen storage tank. As can be appreciated, if fuel is withdrawn from a storage vessel, and the fuel is not replenished thereafter in some manner, then eventually there will be no fuel left for the fuel cell to operate. A regenerative fuel cell system addresses this problem by including equipment that may be used to regenerate fuel for the fuel cell. For example, in the case of a hydrogen fuel cell system, the equipment for regenerating fuel may include an electrolyzer that is run to convert water into oxygen gas and hydrogen gas. The electrolyzer may be operated using solar, wind or geothermal energy so as not to deplete the electrical energy produced by operation of the fuel cell. In this manner, a regenerative fuel cell system may be used in a fashion similar to a rechargeable battery, with the electrolyzer being run to store energy and with the fuel cell being run to generate electrical current. A regenerative fuel cell system may include separate electrolyzer and fuel cell units or may include a bifunctional unit that may be alternately operated either as an electrolyzer or as a fuel cell. In those instances in which a bifunctional unit is used, the system is typically referred to as a unitized regenerative fuel cell system. Regenerative fuel cell systems may be either closed-loop, in which case the quantities of fuel, oxidant and products are limited, or open-loop, in which case the quantities are unlimited.

Additional background information relating to regenerative fuel cell systems may be found, for example, in the following patents and publications, all of which are incorporated herein by reference: U.S. Pat. No. 6,887,601 B2, inventors Moulthrop, Jr. et al., issued May 3, 2005; U.S. Pat. No. 6,838,205 B2, inventors Cisar et al., issued Jan. 4, 2005; U.S. Pat. No. 6,833,207 B2, inventors Joos et al., issued Dec. 21, 2004; U.S. Pat. No. 3,981,745, inventor Stedman, issued Sep. 21, 1976; Giner et al., "Fuel Cells As Rechargeable Batteries," *Proceedings NATO-ARW, Kiev* 5/95 (Kluwer, Dordrecht, 1/96) pp. 215-232; Burke, "High Energy Density Regenerative Fuel Cell Systems for Terrestrial Applications," *IEEE AES Systems Magazine*, 23-34 (1999); and Ioroi et al., "Thin film electrocatalyst layer for unitized regenerative polymer electrolyte fuel cells," *Journal of Power Sources*, 112:583-7 (2002).

One problem that is commonly encountered with hydrogen fuel cells of the type having a proton exchange membrane is that water tends to accumulate on the membrane, particularly on the oxygen side of the membrane where water is produced. This is problematic because the accumulated water often impedes the delivery of gases to the membrane. To counter this problem, gas flows are often used that are in excess of what is required stoichiometrically so that the excess gas may be used to transport the accumulated water away from the membrane. However, as can be appreciated, where the quantity of oxygen is limited, such as in a closed-loop regenerative fuel cell system, the use of excess oxygen is problematic. To address this problem, the excess oxygen from a fuel cell or, more typically, a fuel cell stack, is typically recycled. However, because there is a pressure drop from the fuel cell stack oxygen inlet to the fuel cell stack oxygen outlet, the recycled oxygen is typically re-pressurized using a gas compressor before joining the oxygen inlet flow stream delivered to the fuel cell stack. The use of a compressor, however, creates its own problems. This is because the recycled oxygen has a high level of humidity; as a result, the compression of the humidified oxygen causes some water to condense in the compressor. However, such condensation of water in the compressor is undesirable as the condensed water adversely affects the performance of the compressor. Consequently, a gas dryer is typically used to remove some, but not all, of the water from the recycled oxygen before the recycled oxygen is sent to the compressor. (It is not desirable to remove all of the water from the recycled oxygen as a certain degree of humidification of the recycled oxygen is desirable to keep the membrane appropriately humidified.) Nevertheless, even using a dryer in the manner described above to remove some of the water from the recycled oxygen, the problem of water condensation in the compressor is not entirely eliminated.

SUMMARY OF THE INVENTION

It is an object of the present invention to provide a novel fuel cell system of the type in which a recycled gas is delivered to the fuel cell.

It is another object of the present invention to provide a fuel cell system of the type described above that overcomes at least some of the problems discussed above in connection with existing fuel cell systems in which a recycled gas is delivered to the fuel cell.

The present invention is based, at least in part, on the discovery that one can recycle and re-pressurize excess fuel or oxidant gas that has been outputted from a fuel cell and stored in a tank by displacing the gas from the tank using pumped water.

Therefore, according to one aspect of the invention, there is provided a fuel cell system comprising (a) at least one fuel cell, said at least one fuel cell having a gas inlet and a gas outlet; (b) a plurality of gas/water separator tanks, each of the gas/water separator tanks being adapted for fluid connection to said gas inlet and said gas outlet of said at least one fuel cell and also being adapted for fluid connection to one another, at least one of said gas/water separator tanks containing a quantity of water; and (c) a pump for transferring water from a gas/water separator tank containing a quantity of water to another gas/water separator tank.

According to another aspect of the invention, there is provided a fuel cell system comprising (a) at least one fuel cell, said at least one fuel cell having a gas inlet for receiving a gas and a gas outlet for expelling an excess of the gas; (b) a plurality of gas/water separator tanks, at least one of said gas/water separator tanks containing a quantity of water, at least another one of said gas/water separator tanks containing a quantity of the gas; (c) means for fluidly connecting each of said plurality of gas/water separator tanks to one of said gas inlet and said gas outlet of said at least one fuel cell; (d) means for connecting said plurality of gas/water separator tanks to one another to permit water transfer therebetween; and (e) a pump for transferring water from a gas/water separator tank containing a quantity of water to another gas/water separator tank containing a quantity of the gas.

According to still another aspect of the invention, there is provided a fuel cell system comprising (a) a fuel cell stack, said fuel cell stack having an oxygen inlet and an oxygen outlet; and (b) means for recycling and re-pressurizing oxygen gas outputted from said oxygen outlet back to said oxygen inlet, said recycling and re-pressurizing means comprising two gas/water separator tanks, each of said gas/water separator tanks containing a quantity of water and a quantity of oxygen gas, and means for transferring water back and forth between said gas/water separator tanks to displace oxygen gas therefrom.

The present invention is also directed to a method of recycling and re-pressurizing gas from a fuel cell stack.

For purposes of the present specification and claims, it is to be understood that the term "proton exchange membrane" is to be construed to be interchangeable with the term "cation exchange membrane," unless specifically denoted otherwise.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
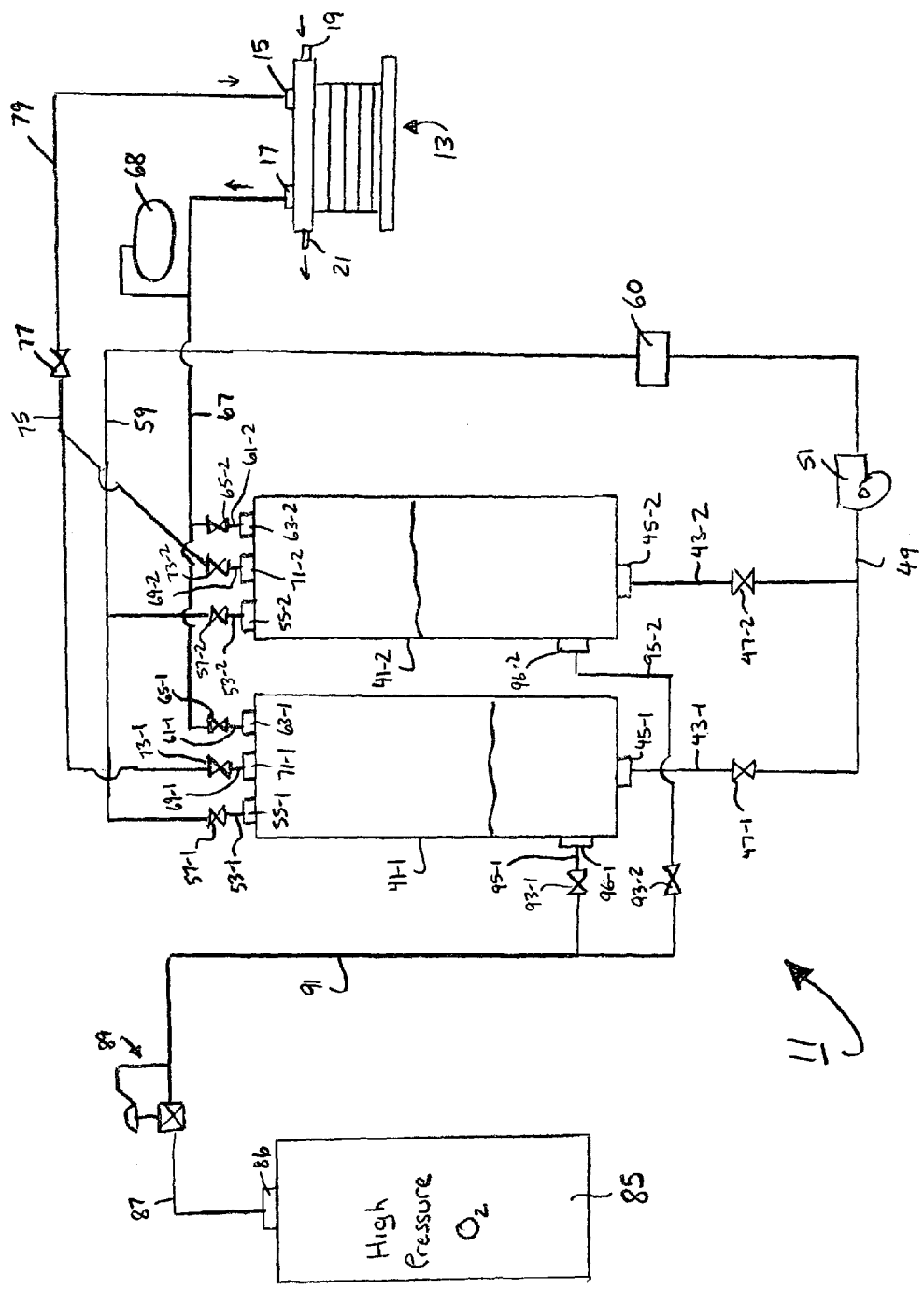
FIG. 1 is a simplified, schematic view of a first embodiment of a fuel cell system constructed according to the teachings of the present invention.
Figure 1A:
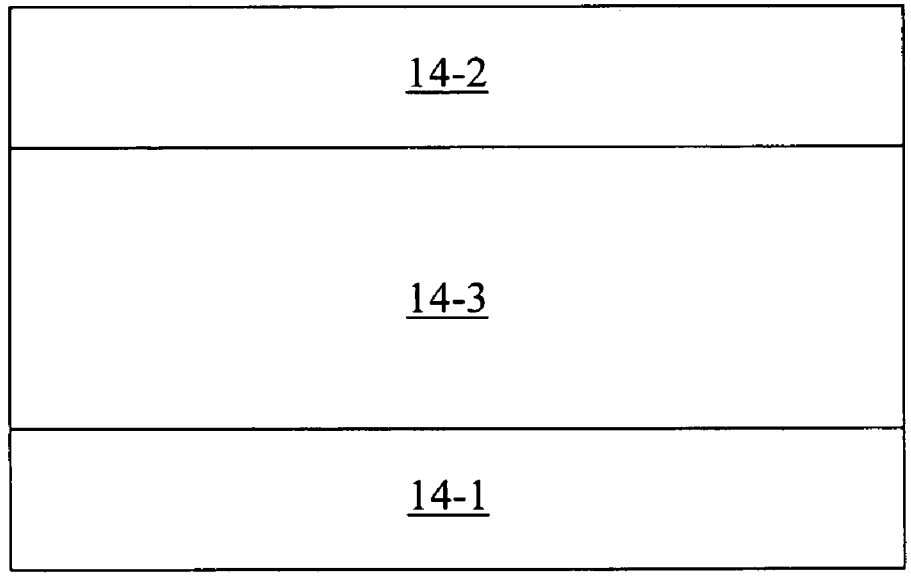
FIG. 1(a) is a simplified schematic view of one of the fuel cells of the fuel cell stack shown in FIG. 1.
Figure 1A:
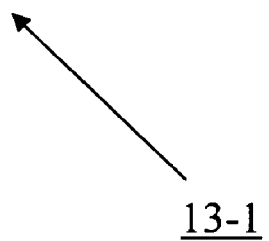

Referring now to FIG. 1, there is schematically shown a first embodiment of a fuel cell system constructed according to the teachings of the present invention, the fuel cell system being represented generally by reference numeral 11.

System 11 comprises a fuel cell stack 13. Fuel cell stack 13 may be a conventional fuel cell stack and is preferably a hydrogen fuel cell stack comprising a bipolar stack of proton exchange membrane fuel cells. Fuel cell stack 13 has an inlet port 15 for receiving oxygen gas and an outlet port 17 for outputting excess oxygen gas and water. In addition, fuel cell stack 13 has an inlet port 19 for receiving hydrogen gas from a source (not shown) and an outlet port 21 for outputting excess hydrogen gas and water. A representative fuel cell from fuel cell stack 13 is shown in FIG. 1(*a*) and is represented generally by reference number 13-1. Fuel cell 13-1 comprises an anode 14-1, a cathode 14-2, and an electrolyte 14-3. Electrolyte 14-3 separates anode 14-1 and cathode 14-2 and is a good conductor of ions but a poor conductor of electrons. Each of inlet port 15 and outlet port 17 is in fluid communication with cathode 14-2, and each of inlet port 19 and outlet port 21 is in fluid communication with anode 14-1.

System 11 also comprises means for recycling and re-pressurizing the oxygen gas outputted from outlet port 17 of fuel cell stack 13 back to inlet port 15 of fuel cell stack 13. In the present embodiment, said recycling and re-pressurizing means comprises a plurality of gas/water separator tanks 41-1 and 41-2. For reasons to be discussed below, each of tanks 41-1 and 41-2 contains a quantity of water.

Said recycling and re-pressurizing means also comprises means for transferring a quantity of water from tank 41-1 to tank 41-2 or from tank 41-2 to tank 41-1. In the present embodiment, said water transferring means comprises a plurality of water lines interconnecting tanks 41-1 and 41-2 through a series of valves and a water pump. More specifically, a water outlet line 43-1 is connected at one end to an outlet port 45-1 of tank 41-1 and at its opposite end to a two-way valve 47-1. Additionally, a water outlet line 43-2 is connected at one end to an outlet port 45-2 of tank 41-2 and at its opposite end to a two-way valve 47-2. A water line 49 is connected at one end to the input end of a water pump 51 and at its opposite end, which is bifurcated, to each of valves 47-1 and 47-2. In addition, a water inlet line 53-1 is connected at one end to an inlet port 55-1 of tank 41-1 and at its opposite end to a two-way valve 57-1. Similarly, a water inlet line 53-2 is connected at one end to an inlet port 55-2 of tank 41-2 and at its opposite end to a two-way valve 57-2. A water line 59 is connected at one end to the output end of water pump 51 and at its opposite end, which is bifurcated, to each of valves 57-1 and 57-2. Additionally, a flow sensor 60 is connected in-line with water line 59 for measuring water flow through line 59 (and, by implication, for measuring gas flow from tanks 41-1 and 41-2). As will be discussed further below, by opening valves 47-1 and 57-2 and by closing valves 47-2 and 57-1, water may be pumped by water pump 51 from tank 41-1 to tank 41-2. Alternatively, by opening valves 47-2 and 57-1 and by closing valves 47-1 and 57-2, water may be pumped by water pump 51 from tank 41-2 to tank 41-1.

Said recycling and re-pressurizing means also comprises means for fluidly connecting inlet port 15 and outlet port 17 of fuel cell stack 13 to each of tanks 41-1 and 41-2. In the present embodiment, said connecting means comprises a plurality of gas lines and a plurality of valves. More specifically, a gas inlet line 61-1 is connected at one end to an inlet port 63-1 of tank 41-1 and at its opposite end to a two-way valve 65-1. Additionally, a gas inlet line 61-2 is connected at one end to an inlet port 63-2 of tank 41-1 and at its opposite end to a two-way valve 65-2. A gas line 67 is connected at one end to outlet port 17 of fuel cell stack 13 and at its opposite end, which is bifurcated, to each of valves 65-1 and 65-2. An accumulator tank 68 is fluidly connected to gas line 67, tank 68 being used to collect a certain amount of oxygen gas to provide a reservoir of gas pressure. (Accumulator tank 68 could alternatively be located on the input side of fuel cell stack 13.) In addition, a gas outlet line 69-1 is connected at one end to an outlet port 71-1 of tank 41-1 and at its opposite end to a two-way valve 73-1. Similarly, a gas outlet line 69-2 is connected at one end to an outlet port 71-2 of tank 41-1 and at its opposite end to a two-way valve 73-2. A gas line 75 is connected at one end to the input end of a check valve 77 and at its opposite end, which is bifurcated, to each of valves 73-1 and 73-2. A gas line 79 is connected at one end to the output end of check valve 77 and at its opposite end to inlet port 15 of fuel cell stack 13. (If desired, valves (not shown) may be positioned along line 79 between check valve 77 and inlet port 15 and along line 67 between accumulator 68 and outlet port 17 to isolate fuel cell stack 13, for example, when fuel cell stack 13 is not being used.) As will be discussed further below, by closing valves 65-2 and 73-1, opening valves 65-1 and 73-2, and pumping water from tank 41-1 to 41-2, one can, by water displacement, force the oxygen gas that is present within tank 41-2 to exit tank 41-2 through line 69-2. Similarly, by closing valves 65-1 and 73-2, opening valves 65-2 and 73-1, and pumping water from tank 41-2 to 41-1, one can, by water displacement, force the oxygen gas that is present within tank 41-1 to exit tank 41-1 through line 69-1. In addition, it should be noted that, at the same time that water is being transferred from tank 41-1 to tank 41-2 or from tank 41-2 to tank 41-1, oxygen gas that is outputted from fuel cell 13 flows into the water-donating tank.

System 11 further includes means for replenishing oxygen that has been converted into water by fuel cell stack 13. In the present embodiment, said oxygen replenishing means comprises a container of oxygen gas and gas lines for fluidly connecting said container to each of tanks 41-1 and 41-2. More specifically, said oxygen replenishing means comprises an oxygen storage vessel 85, vessel 85 containing a quantity of oxygen gas, preferably under high pressure. A gas line 87 is connected at one end to an outlet port 86 of vessel 85 and at its opposite end to the input of a pressure regulator 89. A gas line 91 is connected at one end to the output of pressure regulator 89 and at its opposite end, which is bifurcated, to each of valves 93-1 and 93-2. A gas inlet line 95-1 is connected at one end to valve 93-1 and at its opposite end to an inlet port 96-1 of tank 41-1. Similarly, a gas inlet line 95-2 is connected at one end to valve 93-2 and its opposite end to an inlet port 96-2 of tank 41-2.

In use, the various gas and water valves discussed above are operated so that water is pumped via water pump 51 from one of tanks 41-1 and 41-2 to the other of tanks 41-1 and 41-2 until all of the oxygen gas present within the water-receiving tank is forced out of that tank and conducted towards check valve 77. When the displaced oxygen gas achieves a gas pressure great enough to overcome check valve 77, the oxygen gas passes through check valve 77 and is conducted through line 79 to inlet port 15 of fuel cell 13. Once all of the oxygen gas has been forced out of the water-receiving tank in the above-described manner, the various gas and water valves discussed above are operated so that all of the water that had been present in the water-receiving tank is pumped from that tank to the other tank via water pump 51. In this manner, all of the oxygen gas that is present in the second tank is now expelled from that tank by water displacement. This process of moving water back and forth between tanks 41-1 and 41-2 to displace the oxygen gas present within the tanks is repeated indefinitely to recycle the oxygen outputted from fuel cell 13 back to fuel cell 13. In addition, as oxygen gas is lost from the system due to its conversion to water by fuel cell 13, a replenishing quantity of oxygen gas is conducted from vessel 85 to tank 41-1 or 41-2.

One advantage of system 11, as compared to conventional systems of the type described above that employ blowers/compressors, is that system 11 does not require gas dryers.

This saves significant electromechanical complexity, improves safety, and eliminates a significant parasitic system loss. In addition, liquid pumps of the type used in system 11 typically operate at significantly higher efficiencies than gas compressors, a result which reduces the parasitic losses of compression. Additionally, one can vary the oxygen flow rate and pressure by varying the flow rate of the liquid pump.

It should be noted that, whereas system 11 is a closed system with respect to oxygen gas, the present invention is not limited thereto and could be modified to be an open system with respect to oxygen gas, for example, by joining an open oxygen gas input line to line 79. It should also be noted that, whereas system 11 is described as using oxygen gas as the oxidant, air could alternatively be used. Furthermore, it should be noted that, whereas hydrogen gas is not shown to be recycled in system 11, system 11 could be modified to recycle and re-pressurize excess hydrogen gas in a manner analogous to that described above for excess oxygen gas.

Figure 2A:
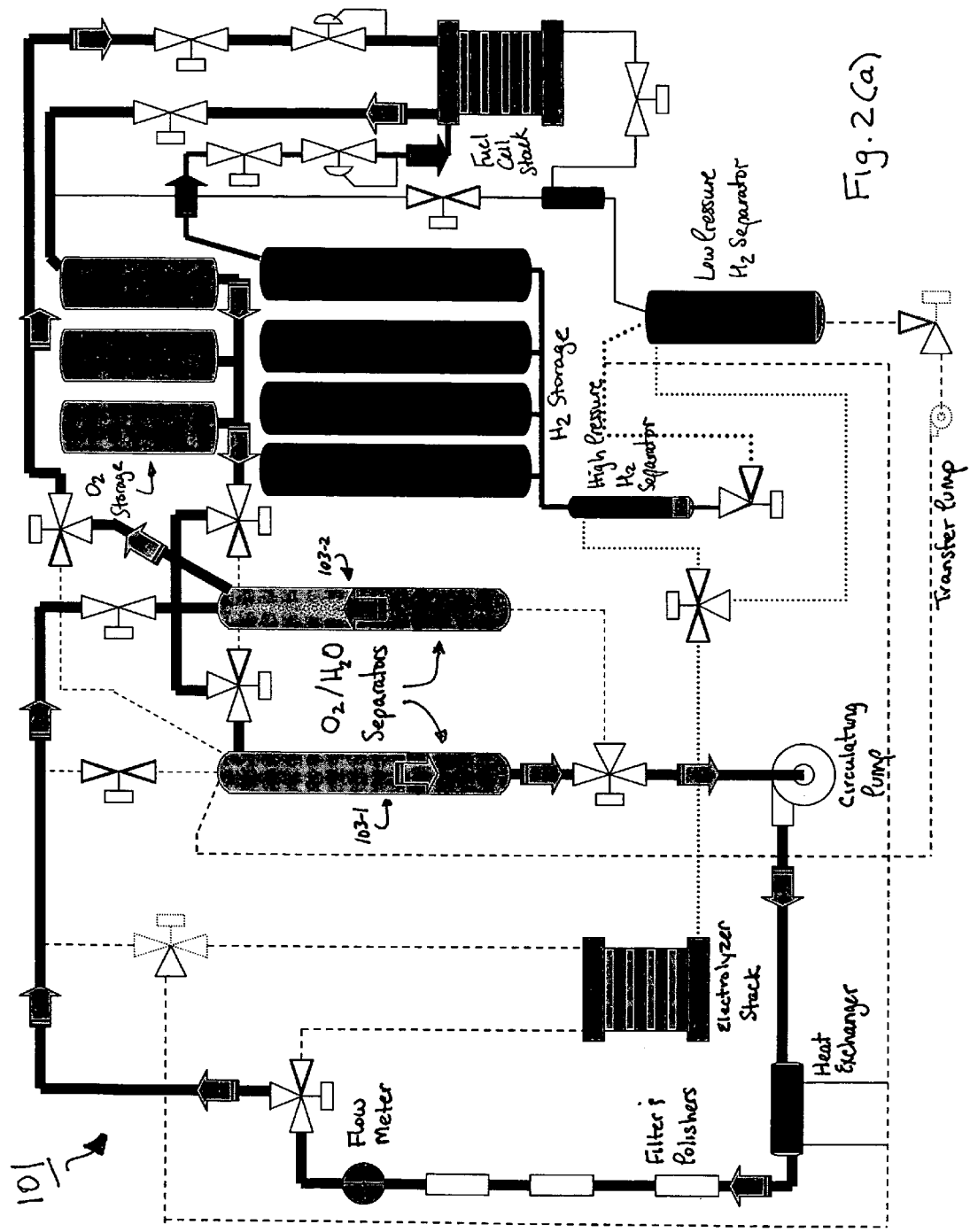
FIGS. 2(a) and 2(b) are simplified, schematic views of a second embodiment of a fuel cell system constructed according to the teachings of the present invention, the fuel cell system being a regenerative fuel cell system operated in fuel cell mode.
Figure 2B:
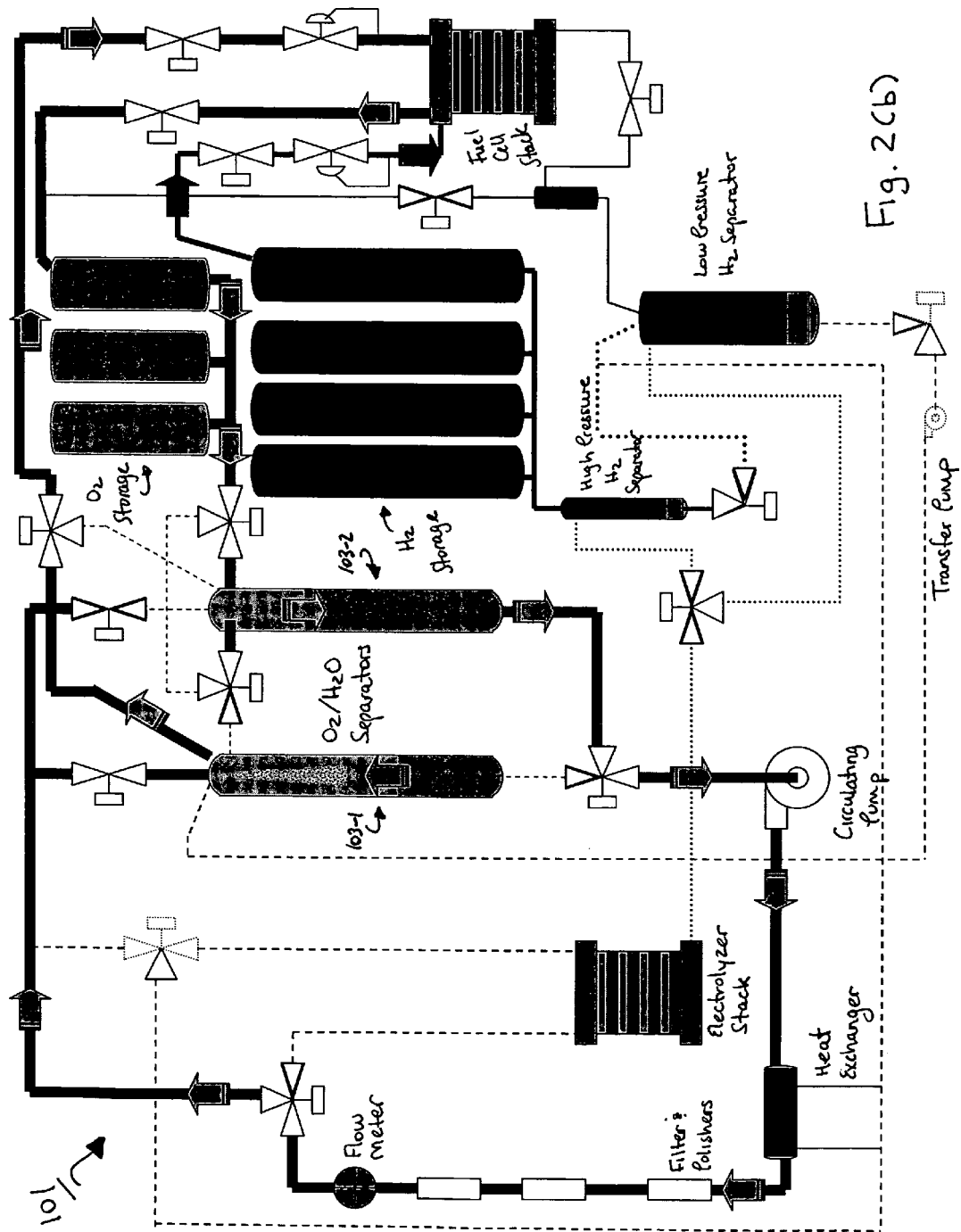

As can be appreciated, when all of the oxygen gas in system 11 has been consumed, fuel cell 13 can no longer be run to generate electrical current. Consequently, according to another embodiment of the present invention, there is provided a regenerative fuel cell system that includes an arrangement similar to that of system 11 for recycling and re-pressurizing excess oxygen gas, an example of such a regenerative fuel cell system being shown in FIGS. 2(*a*) and 2(*b*) and represented generally by reference numeral 101. In FIG. 2(*a*), system 101 is shown operated in fuel cell mode (as opposed to electrolyzer mode), with its series of valves arranged for water to flow from tank 103-1 to 103-2. In FIG. 2(*b*), system 101 is shown operated in fuel cell mode, with its series of valves arranged for water to flow from tank 103-2 to 103-1.

One advantage of system 101, as compared to conventional regenerative fuel cell systems, is the replacement of compressors or blowers with one or more water pumps, which may also be used to pump water to the electrolyzer, thereby maximizing "dual-use" components.

Figure 3:
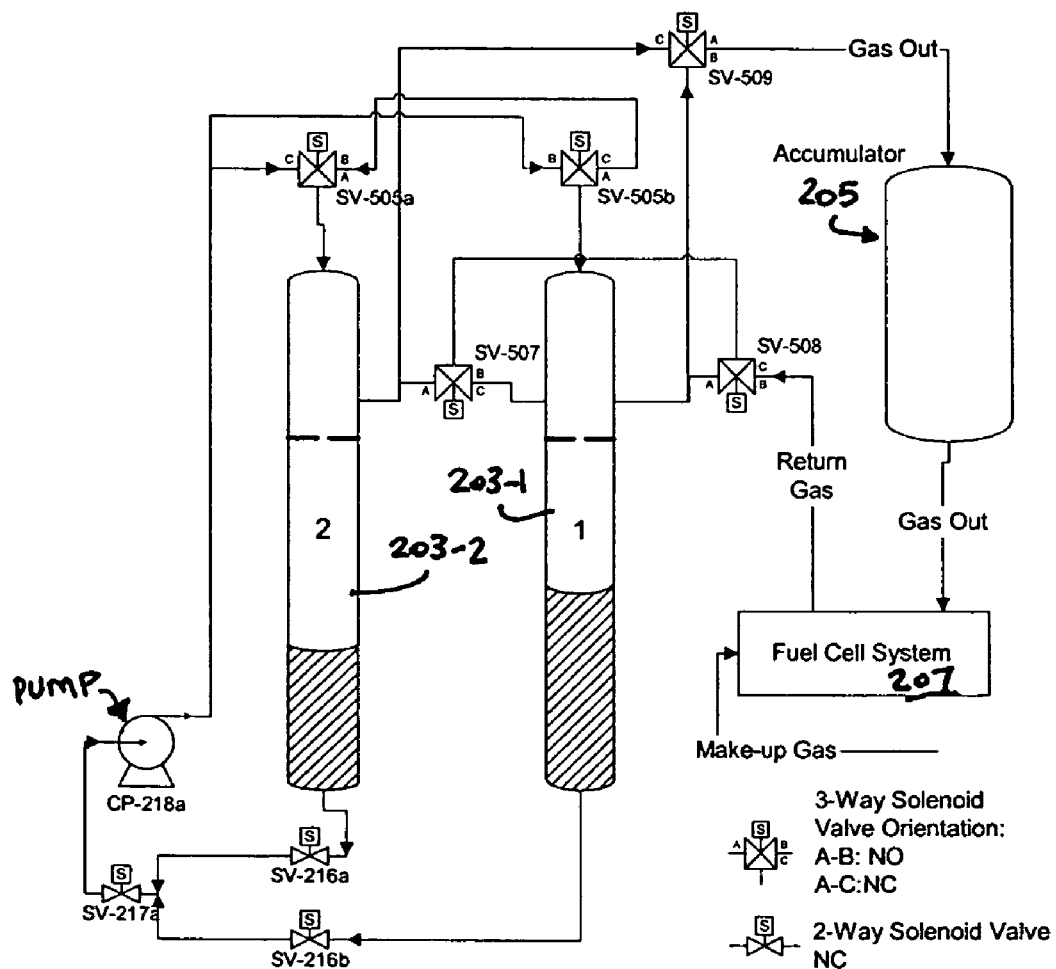
FIG. 3 is a simplified, schematic view of a third embodiment of a fuel cell system constructed according to the teachings of the present invention.

The following examples are provided for illustrative purposes only and are in no way intended to limit the scope of the present invention:

Referring now to FIG. 3, there is shown a simplified, schematic view of a third embodiment of a fuel cell system constructed according to the teachings of the present invention, the fuel cell system being represented generally by reference numeral 201. In system 201, water is pumped at a constant rate between tanks 203-1 and 203-2. As one tank is filled, the second is drained. The gas displaced in the tank being filled with water flows through an accumulator 205, then to a fuel cell system 207 and then returns to the tank being drained, thus generating the gas circulation. As the level in the tank being drained approaches empty, the direction of water flow is reversed by switching the solenoid valves (see Table I below). The water is pumped at a constant flow rate, even during valve switching, allowing nearly constant displacement of gas from the vessels.

A physical embodiment of system 201 was constructed with two water tanks having a volume of 77 liters each. The accumulator tank dampens the pressure and flow variations in the fuel cell feed. To test the dampening effect, two accumulator tanks with a volume of 49 liters each were installed. These tanks could be used individually or together. Make-up gas was added to the system to compensate for that consumed by the fuel cell. The gas flow circulation rate in the system can be increased or decreased by varying the speed of the water pump. The test system was designed to simulate conditions in a regenerative fuel cell system in which the operating pressure of the fuel cell follows the storage tank pressure. The primary question to be answered in the testing was the amount of variation in the gas flow rate and exit pressure due to switching between tanks. A closed-loop regenerative fuel cell will store hydrogen and oxygen at a maximum of 400 psig. At the beginning of the fuel cell cycle, the storage tanks will be fully charged. As the reactants are consumed, the storage pressure will drop, with fuel cell operation terminated when the pressure drops below 30 psig. A gas flow circulation rate in the range of 100 to 140 slpm $O_2$, or 3× the stoichiometric rate, is required to operate a 10 kW fuel cell. At high pressure, the actual oxygen flow rate, and thus the water flow required to displace the oxygen, is less than 4 lpm. However, at 30 psig, the actual oxygen flow rate is approximately 40 lpm.

A series of valves having a pressure drop of ~20 psig and an adjustable exhaust valve were used to simulate the pressure drop through the fuel cell system and the fuel cell $O_2$ consumption, respectively. A gas flow meter on the exit of the accumulator tank was used to measure the gas flow rate.

Figure 4:
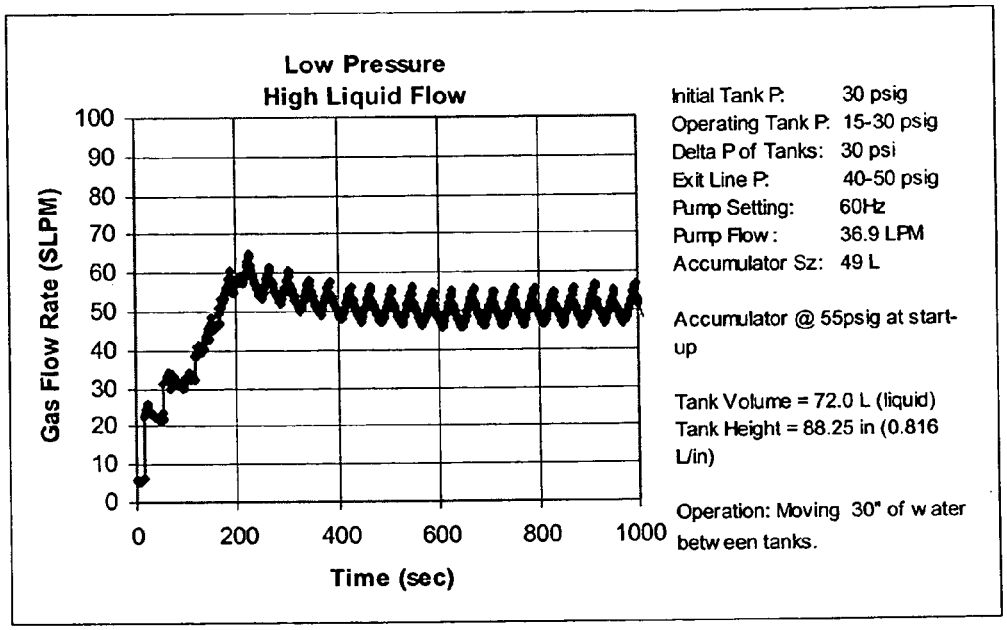
FIG. 4 is a graph depicting, under low pressure conditions, the gas flow rate out of a 49 liter accumulator used in the system of FIG. 3 as a function of time.
Figure 5:
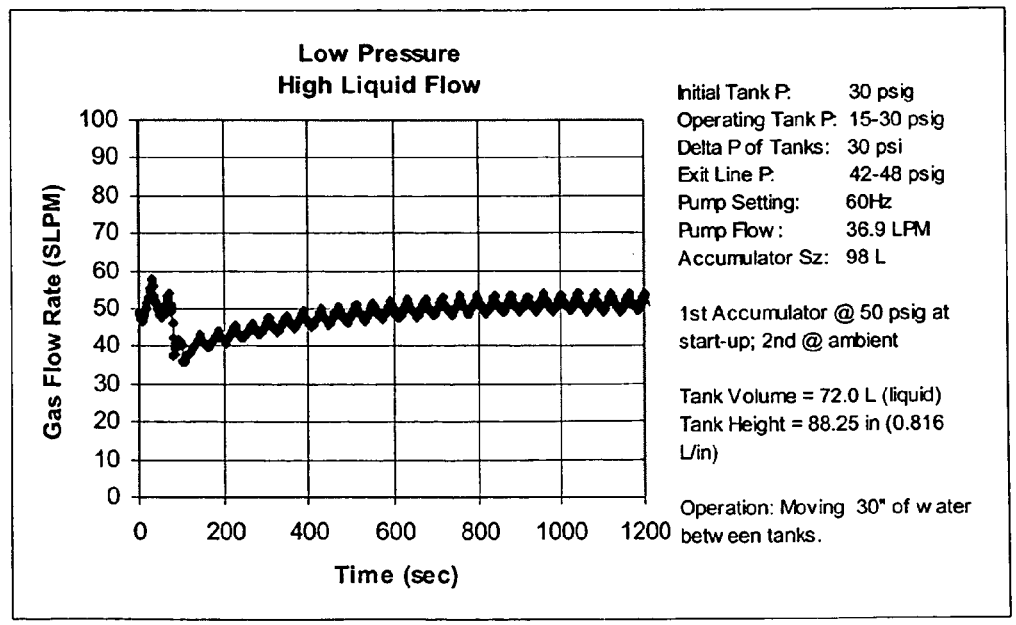
FIG. 5 is a graph depicting, under low pressure conditions, the gas flow rate out of a 98 liter accumulator used in the system of FIG. 3 as a function of time.

Prior to testing, the re-circulation system was leak-checked to a pressure of 450 psig for 72 hours. To simulate the end of fuel cell operation in a regenerative system, i.e., the low pressure state, two tests were conducted at 30 psig. An accumulator size of 49 liters was used in the first test, 98 liters in the second test. All other conditions were held constant including the water flow rate between the vessels, which was set at ~37 lpm. Approximately 25 liters of water, one-third of the volume of one tank, were pumped between the two tanks to displace the air. Results of these tests are shown in FIGS. 4 and 5, respectively, plotted as gas flow out of the accumulator versus time. Both tests successfully demonstrated that the required gas circulation rates for a 10 kW fuel cell of 40-50 slpm were achievable with relatively minor fluctuations in flow rate. Increasing the size of the accumulator from 49 to 98 liters dampened the fluctuation, resulting in variations of less than 10% from the baseline flow. Without an accumulator, the gas circulation rate in the system fluctuated from 0 to 120 slpm.

Figure 6:
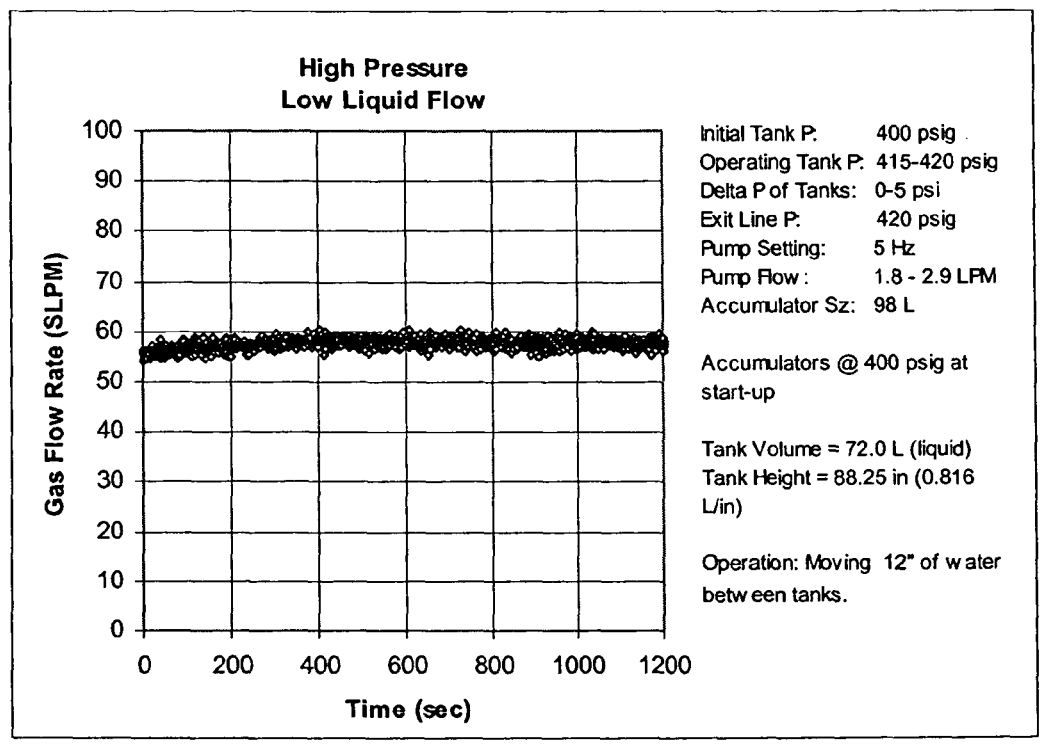
FIG. 6 is a graph depicting, under high pressure conditions, the gas flow rate out of a 98 liter accumulator used in the system of FIG. 3 as a function of time.

To simulate the high pressure scenario in the regenerative system, the water vessels were pressurized to 400 psig and water was circulated between the vessels at a rate of <3.0 lpm. The accumulator volume was 98 liters. The results shown in FIG. 6 indicate a stable gas circulation rate of 60±3 slpm through the fuel cell system.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. A fuel cell system comprising:
   (a) at least one fuel cell, said at least one fuel cell comprising an anode, a cathode, an electrolyte separating said anode and said cathode, an oxidant gas inlet in fluid

TABLE I

| | State of Solenoid Valve | | | | | | | |
|---|---|---|---|---|---|---|---|---|
| | SV-216a | SV-216b | SV-505a | SV-505b | SV-507 | SV-508 | SV-509 | SV-217 |
| Vessel 1 | open | closed | A-B open | A-B open | A-B open | A-B open | A-B open | open |
| Vessel 2 | closed | open | A-C open | A-C open | A-B open | A-C open | A-C open | open | communication with said cathode and an excess oxidant gas outlet in fluid communication with said cathode;

(b) a plurality of gas/water separator tanks, each of the gas/water separator tanks being adapted for fluid connection to said oxidant gas inlet and to said excess oxidant gas outlet of said at least one fuel cell and also being adapted for fluid connection to one another, at least one of said gas/water separator tanks containing a quantity of water, at least another of said gas/water separator tanks containing a quantity of oxidant gas; and (c) pump means for transferring water from the at least one gas/water separator tank containing a quantity of water to the at least another gas/water separator tank containing a quantity of oxidant gas so as to displace oxidant gas from the at least another gas/water separator tank containing a quantity of oxidant gas, whereby the displaced oxidant gas is conducted to the oxidant gas inlet.

2. The fuel cell system as claimed in claim 1 wherein said at least one fuel cell comprises a fuel cell stack.

3. The fuel cell system as claimed in claim 2 wherein said fuel cell stack is a hydrogen fuel cell stack comprising a bipolar stack of proton exchange membrane fuel cells.

4. The fuel cell system as claimed in claim 1 wherein said oxidant gas inlet is an oxygen gas inlet and wherein said excess oxidant gas outlet is an oxygen gas outlet.

5. The fuel cell system as claimed in claim 1 wherein said plurality of gas/water separator tanks comprises no more than two gas/water separator tanks.

6. The fuel cell system as claimed in claim 1 wherein said fuel cell system is a regenerative fuel cell system.

7. A fuel cell system comprising:
(a) at least one fuel cell, said at least one fuel cell comprising an anode, a cathode, an electrolyte separating said anode and said cathode, a gas inlet in fluid communication with said cathode for receiving an oxidant gas and a gas outlet in fluid communication with said cathode for expelling an excess of the oxidant gas;
(b) a plurality of gas/water separator tanks, at least one of said gas/water separator tanks containing a quantity of water, at least another one of said gas/water separator tanks containing a quantity of the oxidant gas;
(c) means for fluidly connecting each of said plurality of gas/water separator tanks to each of said gas inlet and said gas outlet of said at least one fuel cell;
(d) means for connecting said plurality of gas/water separator tanks to one another to permit water transfer therebetween; and
(e) a pump for transferring water from a gas/water separator tank containing a quantity of water to another gas/water separator tank containing a quantity of the oxidant gas so as to displace oxidant gas from the gas/water separator tank containing a quantity of oxidant gas, whereby the displaced oxidant gas is conducted to the gas inlet.

8. The fuel cell system as claimed in claim 7 wherein said at least one fuel cell comprises a fuel cell stack.

9. The fuel cell system as claimed in claim 8 wherein said fuel cell stack is a hydrogen fuel cell stack comprising a bipolar stack of proton exchange membrane fuel cells.

10. The fuel cell system as claimed in claim 7 wherein said gas inlet is an oxygen gas inlet and wherein said gas outlet is an oxygen gas outlet.

11. The fuel cell system as claimed in claim 7 wherein said plurality of gas/water separator tanks comprises no more than two gas/water separator tanks.

12. The fuel cell system as claimed in claim 7 wherein said means for connecting said plurality of gas/water separator tanks to one another permits water to be transferred reversibly from one of said gas/water separator tanks to another.

13. The fuel cell system as claimed in claim 7 further comprising a flow sensor for sensing the flow of water from one of said gas/water separator tanks to another.

14. The fuel cell system as claimed in claim 7 further comprising a check valve coupled to said means for fluidly connecting each of said plurality of gas/water separator tanks to one of said gas inlet and said gas outlet.

15. The fuel cell system as claimed in claim 7 further comprising at least one accumulator tank coupled to said means for fluidly connecting each of said plurality of gas/water separator tanks to one of said gas inlet and said gas outlet.

16. The fuel cell system as claimed in claim 7 further comprising a storage vessel containing a quantity of the oxidant gas and means for conducting a quantity of the oxidant gas to at least one of the gas/water separator tanks as the oxidant gas is consumed by the at least one fuel cell.

17. The fuel cell system as claimed in claim 7 wherein said fuel cell system is a regenerative fuel cell system.

18. A fuel cell system comprising:
(a) a fuel cell stack, said fuel cell stack comprising a plurality of fuel cells, each of said fuel cells comprising an anode, a cathode and a separating electrolyte, said fuel cell stack further comprising an oxygen inlet in fluid communication with each of said cathodes and an oxygen outlet in fluid communication with each of said cathodes; and
(b) means for recycling and re-pressurizing oxygen gas outputted from said oxygen outlet back to said oxygen inlet, said recycling and re-pressurizing means comprising two gas/water separator tanks, each of said gas/water separator tanks containing a quantity of water and a quantity of oxygen gas, and means for transferring water back and forth between said gas/water separator tanks to displace oxygen gas therefrom, the displaced oxygen gas being conducted to said oxygen inlet.

19. The fuel cell system as claimed in claim 18 wherein said fuel cell is a regenerative fuel cell system.

20. A hydrogen gas fuel cell system comprising:
(a) at least one hydrogen gas fuel cell, said at least one hydrogen gas fuel cell comprising an anode, a cathode, a separating electrolyte, an inlet in fluid communication with said cathode for receiving a gas and an outlet in fluid communication with said cathode for discharging an excess of said gas;
(b) a plurality of gas/water separator tanks, each of the gas/water separator tanks being adapted for fluid connection to said inlet and said outlet of said at least one hydrogen gas fuel cell and also being adapted for fluid connection to one another, at least one of said gas/water separator tanks containing a quantity of water, at least another one of said gas/water separator tanks containing a quantity of the gas; and
(c) a pump for transferring water from a gas/water separator tank containing a quantity of water to a gas/water separator tank containing a quantity of the gas, whereby the transfer of water to the gas/water separator tank containing a quantity of the gas causes the displacement of some of the gas from the gas/water separator tank containing the quantity of the gas to the gas inlet.

* * * * *